June 17, 1969    R. C. MOHRMAN    3,449,945
OPTICAL SCANNING SYSTEMS FOR PHOTOELECTRIC TONOMETERS
Filed April 24, 1967                    Sheet 1 of 4

RICHARD C. MOHRMAN
INVENTOR.

BY *Charles C. Krauzak*

ATTORNEY

RICHARD C. MOHRMAN
INVENTOR.

BY Charles C. Krawzak

ATTORNEY

June 17, 1969   R. C. MOHRMAN   3,449,945
OPTICAL SCANNING SYSTEMS FOR PHOTOELECTRIC TONOMETERS
Filed April 24, 1967   Sheet 3 of 4

RICHARD C. MOHRMAN
INVENTOR.

BY Charles C. Krawczyk

ATTORNEY

United States Patent Office 3,449,945
Patented June 17, 1969

3,449,945
OPTICAL SCANNING SYSTEMS FOR PHOTO-ELECTRIC TONOMETERS
Richard C. Mohrman, Irondequoit, N.Y., assignor to Bausch & Lomb Incorporated, Rochester, N.Y., a corporation of New York
Filed Apr. 24, 1967, Ser. No. 633,020
Int. Cl. A61b 9/00
U.S. Cl. 73—80                                11 Claims

ABSTRACT OF THE DISCLOSURE

An optical scanning system for photoelectric apparatus, such as applanation tonometers, is disclosed including a motor driven beam scanner having at least one reflective element or a refractive element. A beam of radiation from a slit source is applied to the scanner. Radiation from the scanner is directed towards an imaging lens system to provide a beam of radiation having an elongated cross-section focused on an image plane. The motion of the scanner provides for periodically scanning the image plane with the elongated beam.

CROSS REFERENCES TO RELATED INVENTIONS

The scanning system of the invention is an improvement over the disclosed scanning systems in two copending applications entitled, "Applanation Tonometer," Ser. No. 378,846 filed June 29, 1964, and 379,123 filed June 30, 1964, now Patents 3,338,089 and 3,338,090, respectively, and assigned to the assignee of the present application. The embodiments of the scanning system are also adapted for use with tonometer probes such as disclosed in a copending application entitled "Probe for Photoelectric Applanation Tonometers," Ser. No. 633,021 filed on the same day as the present application and assigned to the same assignee as the present application.

BACKGROUND OF THE INVENTION

Field of the invention

This invention pertains to a tonometer for measuring and testing the intraocular pressure of an eye.

Description of the prior art

In the design of photoelectric applanation tonometers, it is important to minimize radiation losses in the system to obtain a desirable signal-to-noise ratio. This includes an efficient means of directing radiation for illuminating the eye as well as efficient means for transmitting radiation emitted or reflected from the eye toward a photodetector device. The photoelectric applanation tonometers as disclosed and claimed in the previously filed copending applications employ scanning devices comprising a rotating disc formed with a plurality of slits or apertures therein that are scanned across a beam of radiation reflected from the eye to provide a periodic signal having a time duration corresponding to the size of the area of an eye engaged by the tonometer probe. This present application discloses improved scanning systems that provide a better signal-to-noise ratio than that of the previously filed copending applications.

SUMMARY OF THE INVENTION

The optical scanning system of the invention includes a scanning device having at least one reflective or a refractive scanning element coupled to a motor means for periodically moving the scanning element in a cyclic pattern. A slit source of radiation is provided to direct a beam of radiation toward the scanning element. The beam is redirected by the scanning system towards an imaging system for focusing an image of the slit source on an image plane. As the scanning element is moved, the image plane is scanned by an elongated beam.

The imaging system is adapted to transmit an image of the slit source through a tonometer probe with the tonometer contact anvil as the image plane thereby allowing the eye tested to be periodically scanned by the elongated beam of radiation. The imaging system can be a plurality of lenses when the optical scanning system is a portion of the tonometer probe, or a plurality of lenses and an optical fiber bundle when optical scanning system is remotely located away from the tonometer probe. The radiation emitted or reflected from the eye is directed towards a photodetector device.

A further feature of the invention includes an optical system for redirecting radiation emitted or reflected from the portion of the eye engaged by the contact anvil back toward the scanning element. The scanning element redirects the radiation emitted or reflected toward a radiation sensitive device as a stationary beam.

DESCRIPTION OF THE PREFERRED EMBODIMENTS

Figure 1:
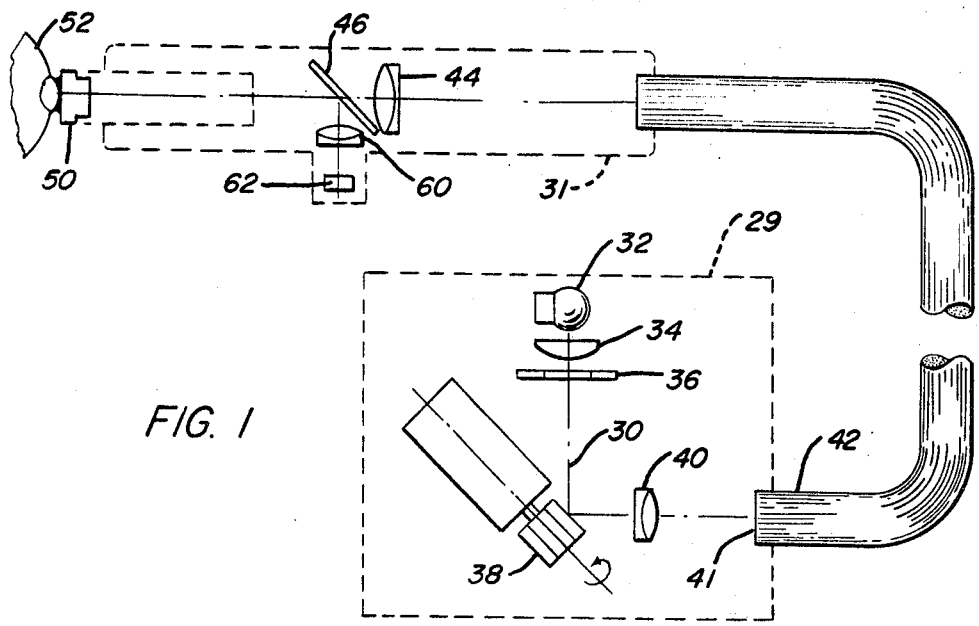
FIG. 1 is an optical schematic diagram of a first embodiment of a tonometer optical scanning system of the invention.
Figure 2:
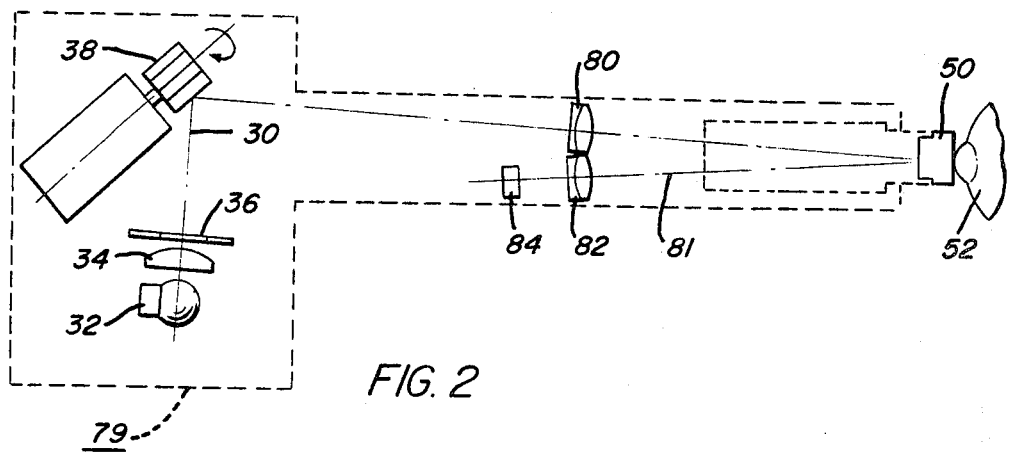
FIG. 2 is an optical schematic diagram of a modification of a tonometer optical scanning system of the invention eliminating the dichroic mirror and optical fiber bundle of FIG. 1.
Figure 3:
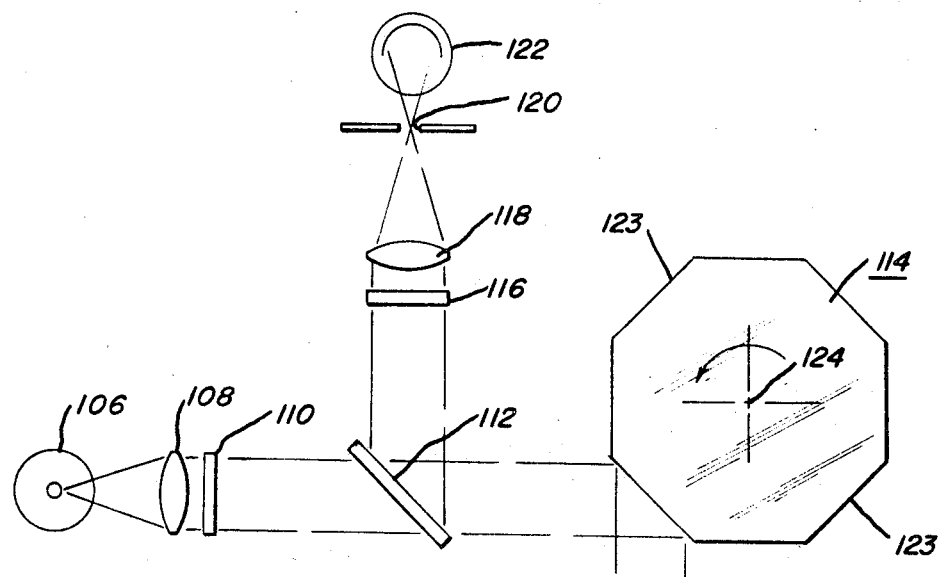
FIG. 3 is an optical schematic diagram of a second embodiment of a tonometer optical scanning system of the invention.
Figure 5:
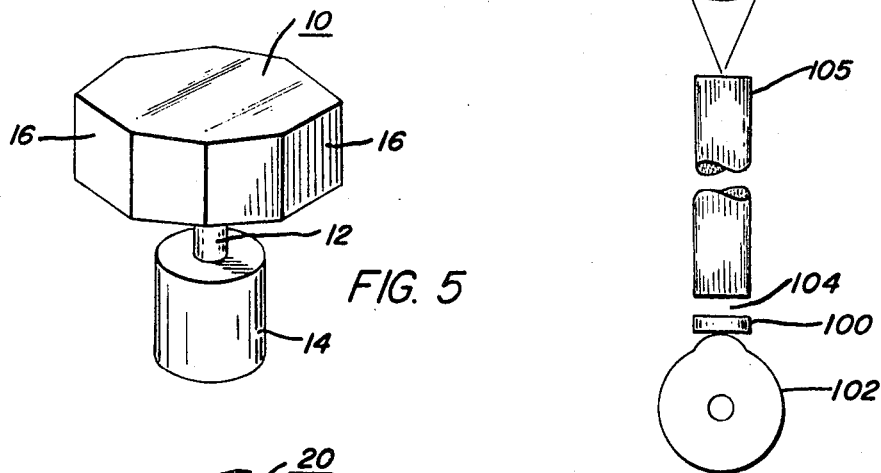
FIG. 5 is a perspective view of the first embodiment of a motor driven scanner for the optical scanning systems of FIGURES 1–4.
Figure 6:
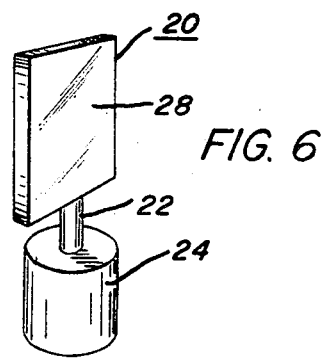
FIG. 6 is a second embodiment of a motor driven scanner for the optical systems of FIGURES 1–4.
Figure 4:
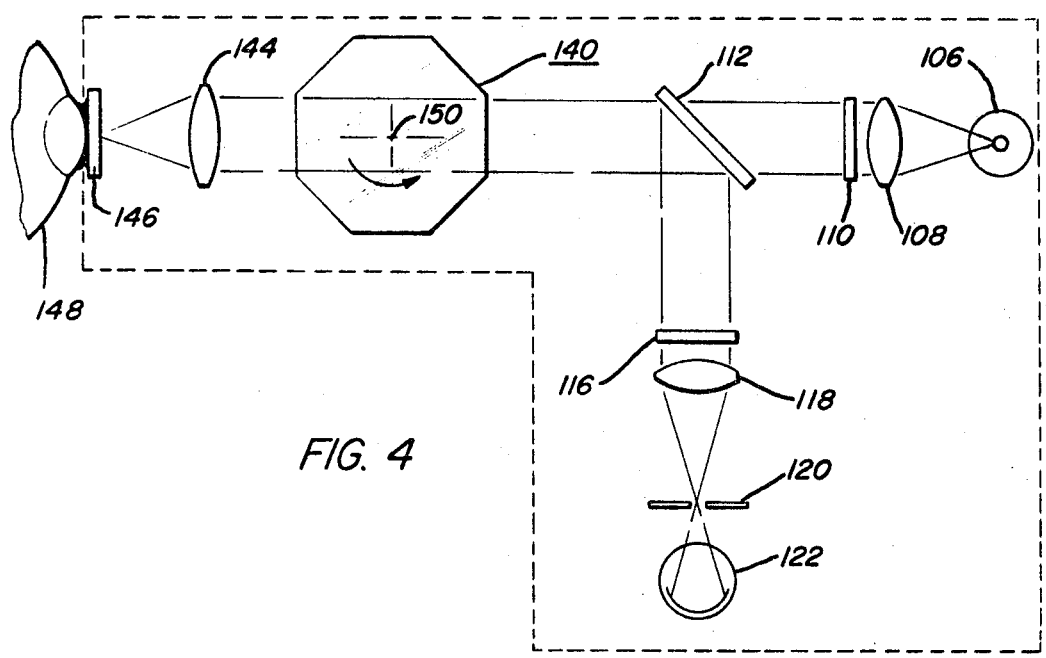
FIG. 4 is an optical schematic diagram of a modification of the scanning system of FIGURE 3 including a refractive element in place of the reflective element.

The scanning systems of FIGURES 1–3 include a motor-driven reflective element for periodically scanning an eye to be tested by an elongated beam of radiation while FIGURE 4 includes a motor driven refractive element. Embodiments of the motor driven scanning elements are illustrated in FIGURES 5 and 6. The scanning device of FIGURE 5 includes a drum 10 coupled to a motor shaft 12 of a motor 14 to rotate at a predetermined rate. When employed in the scanning systems of FIGURES 1–3, the drum 10 includes eight reflective surfaces 16 mounted on the circumference thereof and lie in planes parallel to the axis of the shaft 12. When employed in the scanning system of FIGURE 4, the drum 10 is formed of a radiation transmitting material. The scanner of FIGURE 6 includes a rectangular-shaped member 20 coupled to a shaft 22 to be driven at a periodic rate by a motor 24. The scanning member includes at least one reflective surface 28 when used with the systems of FIGURES 1-3, and is radiation transparent when used with the system of FIGURE 4. The scanners of FIGURES 5 and 6 are adapted to receive radiation from a slit type source and scan the beam of radiation in a predetermined direction at a periodic rate determined by the rotation of the motor shaft and the number of surfaces.

In the scanning system of FIG. 1 the scanning apparatus (enclosed within a dashed block 29) is separated from the tonometer probe 31, of the type described in the copending application Ser. No. 379,123. A beam of radiation 30 from a source 32 is transmitted by a condenser lens 34 through an elongated slit 36 to a motor driven reflective scanner 38 of the type illustrated in FIGURES 5 and 6. The beam of radiation is reflected from a reflective surface of the scanner 38 through a lens 40 to form an image of the slit 36 on an end surface 41 of a coherent optical fiber bundle 42. A second focusing lens 44 receives the image of the slit and directs the radiation through a dichroic mirror 46, to image the slit 36 on a movably mounted transparent contact anvil or tip 50. The mirror 46 is transparent to the wavelengths of the source 32. The tip 50 is adapted to engage an eye 52 to flatten a portion thereof. A transducer (not shown) is coupled to the tip 50 in a manner as set forth in the previously mentioned copending applications to generate a signal corresponding to the force applied to the eye by the tonometer probe.

As the radiation transparent tip 50 engages the eye, an image in the form of a circle 53 and annulus 54 (FIGURE 8) is transmitted back through the tip 50. The annulus 54 is due to a meniscal ring 56 (FIGURE 7) formed between the portion of the eye immediately surrounding the flattened surface of the eye and the tip surface 58 due to a surface tension effect on the liquid in the eye. It should be noted that the meniscal ring 56 has a generally triangular shaped cross-section. When a solution such as a disodium fluorescein is added to the eye, the annulus image 54 can be clearly observed. The dichroic mirror 46 reflects the fluorescent wave lengths of the image of the annulus 54 through a focusing lens 60 to a photosensing device 62.

Figures 7, 8:
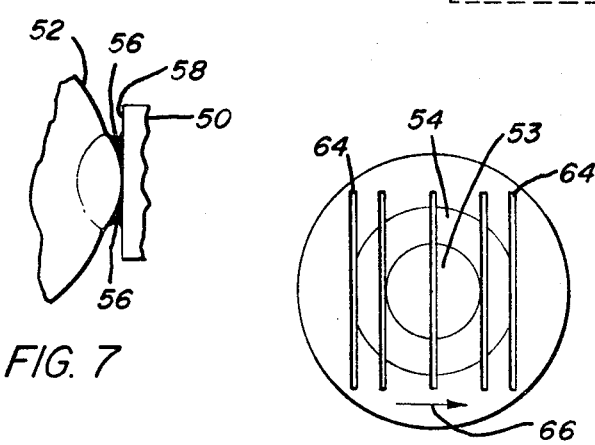
FIG. 7 is an illustration of a tonometer probe engaging an eye for measuring the intraocular pressure thereof.
FIG. 8 is an illustration of an image of the portion of the eye engaged by the probe of FIGURE 7 with a plurality of elongated beams of light corresponding to the illumination of the eye at preset portions of the scanning cycle of the scanning systems of FIGURES 1–4.

The slit 36 is imaged on the eye 52 as an elongated beam 64 by the lenses 40 and 44 in a mnaner as illustrated in FIGURE 8. As the scanning device 38 is rotated, the elongated beam of light 64 is periodically scanned across the eye in the direction of the arrow 66. The amount of radiation instantaneously reflected by the mirror 46 to the photosensor 62 is directly related to the area of the annulus 54 illuminated by the elongated beam 64.

Figure 9:
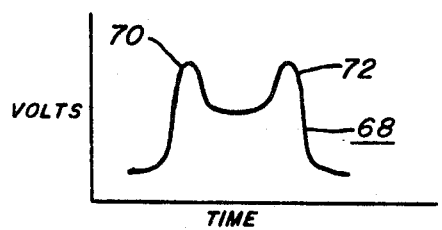
FIG. 9 is a periodic electrical signal generated by the photodetection devices of FIGURES 1–4.

A plot of a signal 68 generated by the photosensor 62 for one period of a scanning cycle is illustrated in FIGURE 9. As illustrated, the signal rises from the low level to a first peak 70 corresponding to a first position of the beam 64 wherein a maximum area of the annulus 54 is illuminated. The signal 68 subsequently decreases and reaches a second peak 72 at the other maximum area of illumination. As the probe 31 is depressed against the eye with increasing force, the size of the area flattened by the tip 50 increases thereby increasing the size of the annulus 54 accordingly. The spacing between the peaks 70 and 72 of the signal 68 increases accordingly. As the result, the photosensor 62 generates a signal having two spaced pulses that are separated in time as a function of the area of the eye flattened by the probe.

Since pressure equals force divided by area, by using the area engaged by the probe (the spacing between the pulses 70 and 72) as a standard and measuring the amount of force applied to the eye, the intraocular pressure of the eye can be measured. An electrical circuit for providing an indication of the intraocular pressure is explained in a later portion of the specification with reference to FIGURE 10.

In the embodiment of FIGURE 2 the dichroic mirror and optical fiber bundle of FIGURE 1 are eliminated. The optical scanning system of FIGURE 2 forms a portion of the tonometer probe enclosed within the dashed block 79. Similar components in FIGURES 1 and 2 are designated by the same reference numerals. The scanning elongated beam from the scanner 38 is imaged by a focusing lens 80 to impinge on the tip 50 at an angle with respect to the end surface for engaging the eye (as compared to a normal angle in the embodiment of FIGURE 1). A beam of radiation 81 is reflected from the eye through a focusing lens 82 onto a photosensing device 84. The scanning system of FIGURE 2 functions in the same manner as previously set forth with regards to FIGURE 1 with the exception that the radiation reflected or emitted from the eye 50 is directly transmitted to the photosensor 84 (rather than that reflected by the dichroic mirror of FIGURE 1).

The scanning system of FIGURE 3 is connected for use with a schematic illustration of the applanation tonometer probe of the copending application Ser. No. 633,021 entitled "Probe For Photoelectric Applanation Tonometers." The probe includes a tip portion 100 adapted to engage an eye 102 for transmitting therethrough an image corresponding to the area of the eye engaged in the same manner as previously discussed with regards to FIGURES 7 and 8. The image is transmitted through an air gap 104 and a coherent fiber bundle 105 towards the optical scanning system. The operation of the tonometer probe is fully explained in the copending application. It is to be understood, however, that the fiber bundle 105 can be eliminated and the scanning system included as a portion of the tonometer probe in a manner similar to that set forth in the apparatus of FIGURE 4.

Radiation for the scanning system is supplied by a slit source 106 of having predetermined wavelength band. A beam of radiation from the source is directed by a collimating lens 108 through a low pass filter 110 towards a dichroic mirror 112. The dichroic mirror 112 passes the band radiation wavelengths emitted by the source 106 to an octangular shaped scanner drum 114 of the type illustrated in FIGURE 5.

The scanner 114 includes eight highly reflective surfaces 123 disposed about its axis of rotation 124. The collimated beam of radiation is reflected by a reflective surface toward a lens 126 so that the slit source 106 is imaged on the end of the optical fiber bundle 105. The image of the slit source is transmitted through the fiber bundle and the tip 100 onto the eye 102 in the form of a elongated beam of light previously as set forth in FIGURE 8. The elongated beam of light is scanned across the eye 102 each time a consecutive reflective surface of the scanner 114 is positioned to receive a beam of light.

Fluorescent radiation emitted from the eye is redirected back through the tip 100 and fiber bundle 105, collimated by the lens 126 and directed toward the same reflected surface of the scanner 114 as previously transmitted. The collimated reflected beam of radiation is redirected by the reflective surface on the scanner 114 to the dichroic mirror 112 wherein the band of wavelengths corresponding to the fluorescent radiation is reflected through a high pass filter 116, a focusing lens 118 and a field stop 120 towards a photosensing device 122. As the scanner 114 rotates, the photosensor 122 generates the periodic signal 68 as previously set forth with regards to FIGURE 9.

In effect, the scanner 114 of FIGURE 3 modulates the beam of radiation from the source 106 to form a periodically scanning beam directed towards tonometer tip 100. The scanner also effectively demodulates the scanning beam of radiation reflected or emitted from the eye to convert the scanning from the eye to a stationary beam. With a stationary beam, the same portion of the photosensing element 122 is irradiated thereby increasing the accuracy of the system by eliminating changes in sensitivity due to signals applied to different portions of the radiation sensitive surface of the photosensing device.

The optical scanning apparatus of FIGURE 4 is similar to that of FIGURE 3 with the exception that the scanning device 140 is a radiation transmitting element and the system is a portion of a movable tonometer probe eliminating the optical fiber bundle. Similar structural elements in FIGURES 3 and 4 are designated with the same reference numerals.

A beam of radiation from the slit source 106 is applied to the octangular shaped rotating drum 140 in the same manner as previously set forth with regards to FIGURE 3. The beam of radiation is transmitted through the scanner 140 and is focused by a lens 144 to form an image of the slit source 106 on the movable tonometer tip 146 for scanning the eye 148 with an elongated beam of radiation as previously set forth with regards to FIGURE 8. As the scanner 140 is rotated about its axis 150, the beam of radiation passing therethrough is refracted so that the tip 146 is periodically scanned by the elongated beam of radiation at a rate determined by the rotation of the scanner 140 and the number of sides formed on the scanner.

The radiation emitted or reflected from the eye 146 is redirected as a collimated beam by the lens 144 back through the scanner 140. The emitted or reflected collimated beam is subsequently directed by the dichroic mirror 112 to the photodetector 122 as previously set forth with regards to FIGURE 3. For all practical purposes the scanning apparatus of FIGURE 4 provides the same scanning effect as that of the apparatus of FIGURE 3 through a refractive phenomenon rather than reflective.

It should be noted that the optical scanning systems of FIGURES 1–4 have the marked advantage over the prior art by directing a concentrated scanning beam of illumination towards the eye and also directing all the radiation of interest from the eye towards the photosensor. This provides a greatly improved signal-to-noise ratio over the apparatus disclosed in the prior art. In the prior art systems of the copending applications Ser. Nos. 378,846 and 379,123 the entire tip of the tonometer probe was illuminated and only a small selected portion of the emitted radiation from the eye passed through the aperture in the scanner or chopper thereby greatly reducing the amount of radiation to reach the photosensing device. In the scanning systems of the present application the energy directed from the source to the eye is concentrated into a narrow slit of radiation thereby increasing the intensity by which the pertinent portion of the eye is irradiated. Furthermore, as previously mentioned, the emitted or reflected radiation of the desired wavelength is directed to the photodetector rather than portions selected by a scanner. In addition to the foregoing advantages, the scanning systems of FIGURES 3 and 4 have the additional advantage of providing a stationary beam of radiation to be applied to the photodetection device thereby eliminating errors due to spatial sensitivity variations of the photosensing device.

Figure 10:
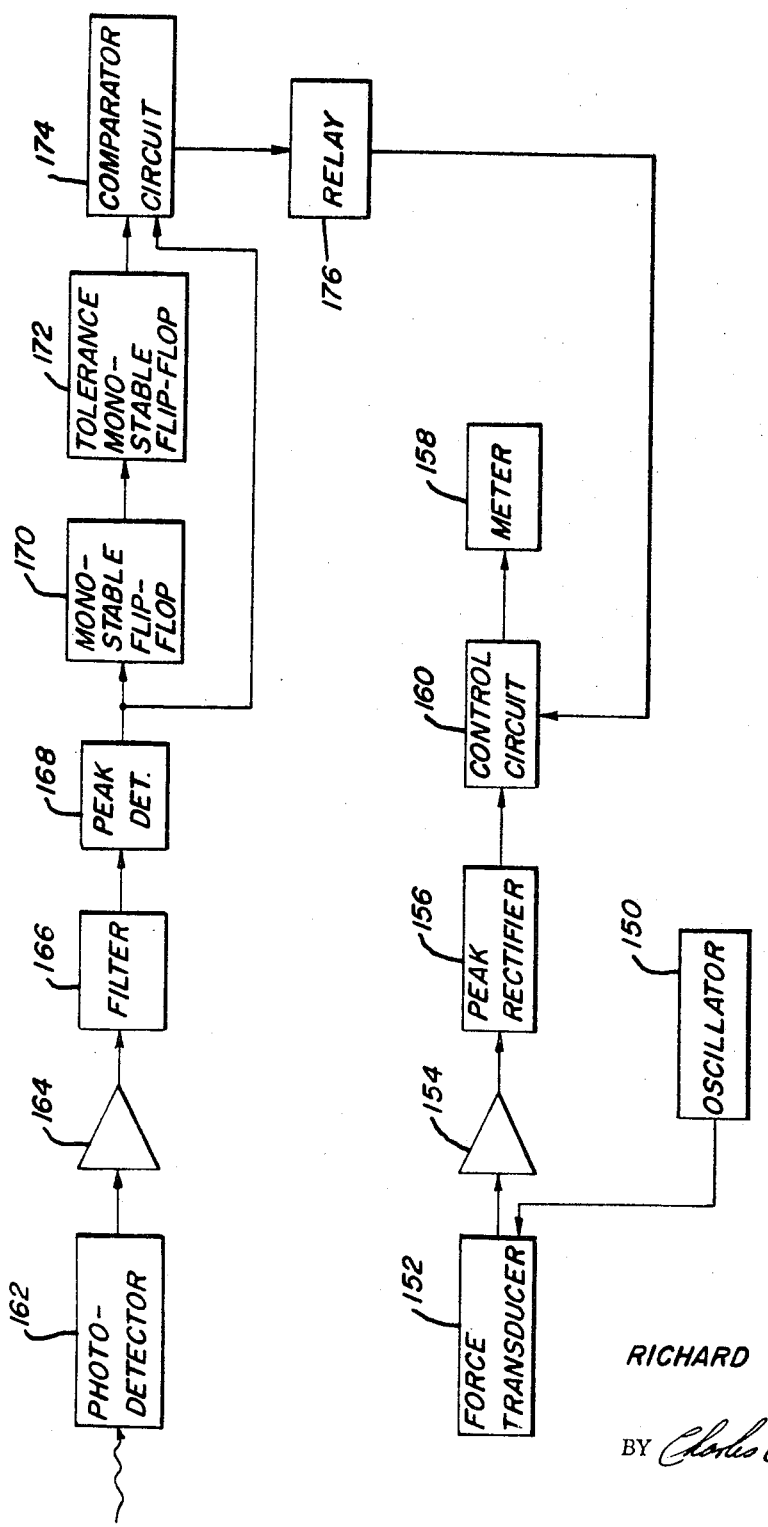
FIG. 10 is a block diagram of an electrical system adapted for use with tonometers including the scanning systems of FIGURES 1–4 for automatically indicating the intraocular pressure of an eye being measured.

The signal from the photosensors of the apparatus of FIGURES 1–4 and the associated force transducer is processed by the circuit of FIGURE 10 to automatically provide a reading corresponding to the intraocular pressure of the eye being tested. An oscillator 150 is connected to a force transducer 152 (of the type previously described in the copending applications) to provide a source of excitation. A signal generated by the force transducer 152 is amplified by an amplifier 154 and applied to a rectifier circuit 156 to provide a direct current signal corresponding to the force applied to the eye by the probe. The direct current signal is applied to a meter 158 through a suitable control circuit 160.

The signal 68 generated by the photodetector 162 is amplified by an amplifier 164 and filtered by a filter circuit 166. The filtered signal is applied to a suitable peak detector circuit 168 that generates a sharp pulse when the peaks 70 and 72 of the signal 68 of FIGURE 9 has been reached. The output signals from the peak detector 168 are applied to a standard mono-stable flip-flop circuit 170. The first pulse from the peak detector circuit 168 sets the standard mono-stable flip-flop. The mono-stable flip-flop 170 resets itself to the original position after a preset standard time duration. A tolerance mono-stable flip-flop 172 is set by the output pulse from the standard mono-stable multivibrator 170 after the standard time interval and remains set for a tolerance period.

The output signals from the flip-flop 172 and the peak detector 168 are applied to a suitable comparison circuit 174. The comparison circuit 174 is a gate circuit wherein the presence of the signal from the mono-stable flip-flop 172 when set and the presence of a second peak from the peak detector provides an output signal. Since an output signal from this comparison circuit occurs only when the second peak 72 is present during the tolerance period of the mono-stable flip-flop 172, only the desired spacing between the pulses 70 and 72 triggers a relay circuit 176. Since the peaks of the signals 72 and 70 are spaced according to the diameter of the annulus 54 (and therefore a function of the area of the eye flattened by the probe), by comparing this time duration to a standard, a signal is generated by the comparator circuit 174 when the area of contact reaches a predetermined size. The control signal from the comparator circuit 174 is applied to a relay circuit 176 for actuation thereof. The relay circuit is coupled to the control circuit 160 so that the meter 158 holds a reading corresponding to the force applied to the eye at the time the area of contact is of the predetermined size. The meter 158 is calibrated to convert the signals generated by the transducer 152 into readings of intraocular pressure.

What is claimed is:

1. An optical scanning system for a photoelectric applanation tonometer having a radiation transparent contact anvil comprising:
   a slit source of radiation;
   optical means focusing an image of said slit source on said contact anvil;
   scanning means including at least one reflective surface;
   means for movably mounting said scanning means to receive a beam from said source and reflect said beam toward said optical means, and
   motor means coupled to said scanning means for periodically moving said reflective surface so that said contact anvil is periodically scanned by a beam of radiation having an elongated cross-section.

2. An optical scanning system as defined in claim 1 wherein said slit source of radiation comprises:
   a lamp;
   a field stop formed with a slit aperture, and
   optical means for evenly illuminating said field stop.

3. An optical scanning system as defined in claim 1 wherein:
   said scanning means comprises a rotatable drum having a plurality of reflective surfaces equally spaced about an axis of rotation, and
   said means for mounting said scanning means mounts said drum to intercept said beam with said axis of rotation transversely disposed with respect to the direction of said beam of radiation so that said motor means rotates said drum about said axis to sequentially position said plurality of reflective surfaces for receiving and reflecting said beam toward said optical means.

4. An optical scanning system for a photoelectric applanation tonometer having a radiation transparent contact anvil comprising:
   a slit source of radiation;
   optical means focusing an image of said slit source on said contact anvil;
   scanning means including a radiation transparent refractive element;
   means for movably mounting said scanning means to receive said beam for transmitting said beam through said refractive element towards said optical means, and motor means coupled to said scanning means for periodically moving said refractive element so that said contact anvil is periodically scanned by a beam of radiation having an elongated cross-section.

5. An optical scanning system as defined in claim 4 wherein:

said scanning means comprises a radiation transmitting rotatable drum having a plurality of substantially flat surfaces equally spaced about an axis of rotation, and said means for mounting said scanning means mounts said drum to intercept said beam with said axis of rotation transversely disposed with respect to the direction of said beam of radiation so that said motor means rotates said drum about said axis to sequentially position said plurality of flat surfaces for receiving and refracting said beam toward said optical means.

6. A scanning system for a photoelectric tonometer including a proble having a radiation transparent contact anvil for contacting an eye, an optical system for directing a beam of radiation towards the contact anvil for illuminating the portion of the eye contacted by the contact anvil and transmitting an image corresponding to the area of contact to a radiation sensitive device, said scanning system comprising:

means providing a beam of radiation having an elongated cross-section:

scanning means including at least one reflective surface;

means for movably mounting said scanning means to receive said beam of radiation and reflect said beam of radiation toward said optical system, and motor means connected to said scanning means moving said reflective surface in a cyclic pattern so that said beam of radiation is reflected from said reflective surface through said optical system to said anvil in the form of a periodically repeating scanning beam having an elongated cross-section.

7. A scanning system as defined in claim 6:

wherein said scanning means includes a rotatable drum having a plurality of substantially flat reflection surfaces equally spaced about an axis of rotation and in substantial parallel relation with an axis of rotation;

wherein said means for movably mounting said scanning means mounts said rotatable drum for rotation about said axis; and wherein said motor means rotates said reflective drum about said axis to sequentially position said plurality of reflective surfaces to reflect said beam of radiation toward said optical system.

8. An optical scanning system for a photoelectric tonometer including a probe having a radiation transparent contact anvil for contacting an eye, an optical system for directing a beam of radiation towards the contact anvil for illuminating the portion of the eye contacted by the contact anvil and transmitting therethrough an image received from the contact anvil corresponding to the area of contact, said optical scanning system comprising:

a slit source of radiation scanning means including at least one reflective surface;

radiation sensitive means for generating an electrical signal corresponding to the amount of radiation received;

first optical means directing a beam of radiation from said source toward said scanning means for reflection from said reflective surface toward said probe optical system to illuminate said contact anvil and so that said reflective surface receives and reflects said image from said probe optical system, said first optical means cooperates with said probe optical system to focus an image of said slit source on said contact anvil;

second optical means positioned to receive said image reflected by said reflective surface and transmit said image toward said radiation sensitive means, and motor means coupled to said scanning means for moving said reflective surface in a cyclic pattern.

9. A scanning system as defined in claim 8:

wherein said scanning means includes a rotatable drum having a plurality of reflective surfaces equally spaced about an axis of rotation, and wherein said motor means is coupled to said drum to sequentially rotate each of said plurality of reflective surfaces for receiving and reflecting said beam toward said probe optical system, and receiving and reflecting said image toward said second optical means.

10. An optical scanning system as defined in claim 9 wherein:

said first optical means includes a first lens system for transmitting a collimated beam of radiation toward said drum, and a second lens system positioned to receive a reflected collimated beam from said drum for transmission toward said probe optical system and to receive said image from said probe optical system for transmission toward said drum.

11. An optical scanning system as defined in claim 10 wherein:

said second optical means includes a dichroic mirror positioned between said first lens system and said reflective drum for transmitting a first band of wavelengths towards said drum and reflecting a second band of wavelengths toward said radiation sensitive device.

References Cited

UNITED STATES PATENTS

| | | | |
|---|---|---|---|
| 3,150,520 | 9/1964 | Mackay | 73—80 |
| 3,150,521 | 9/1964 | Mackay | 73—80 |
| 3,338,089 | 8/1967 | Coombs | 73—80 |

RICHARD C. QUEISSER, *Primary Examiner.*

C. E. SNEE, *Assistant Examiner.*